Figure 1:
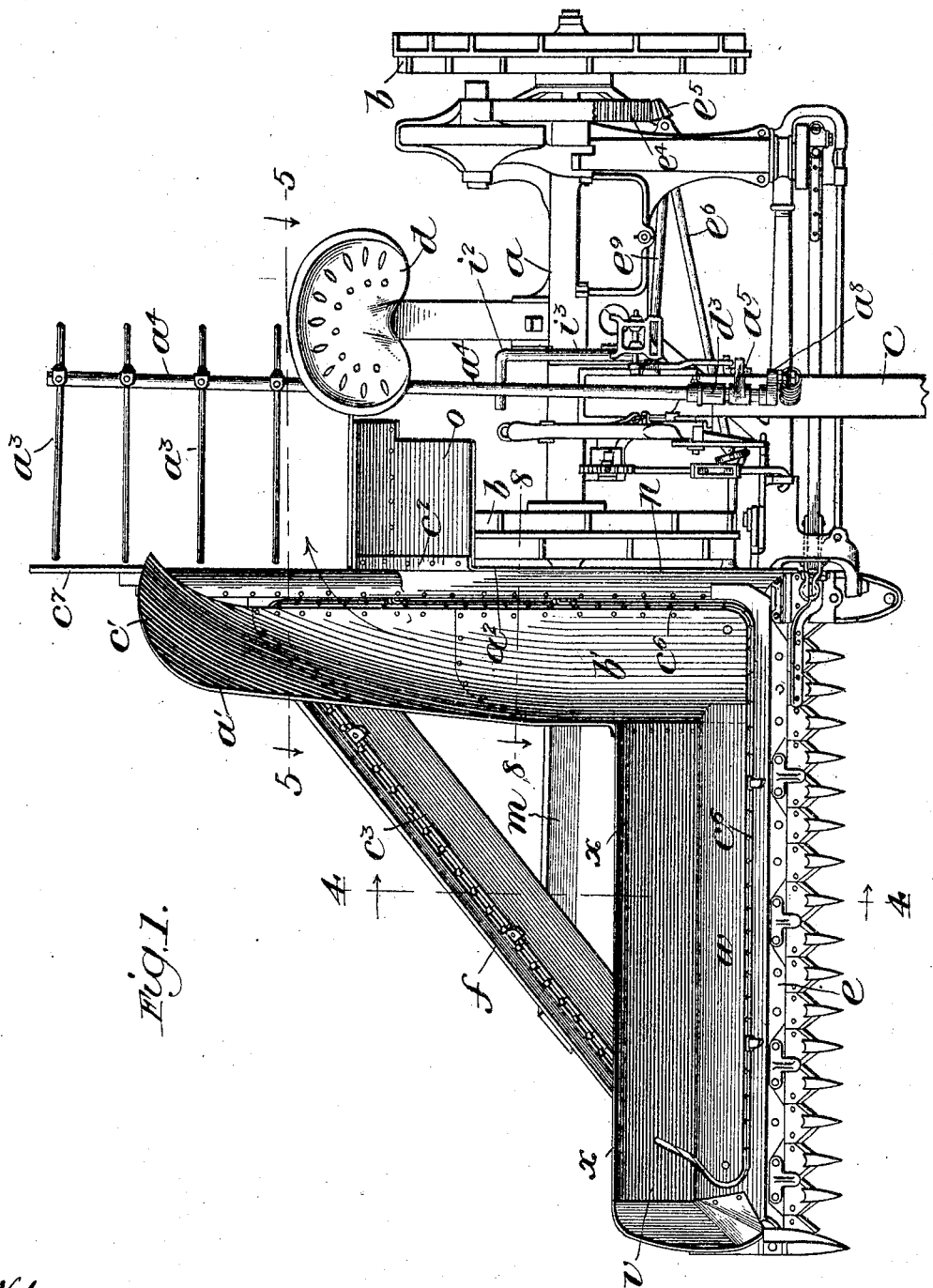

No. 770,860. PATENTED SEPT. 27, 1904.
E. A. JOHNSTON.
BUNCHING ATTACHMENT FOR MOWERS.
APPLICATION FILED DEC. 1, 1903.
NO MODEL. 6 SHEETS—SHEET 1.

Witnesses:
J. M. Wann
E. E. Schuermann

Inventor:
E. A. Johnston
By his attys
Pennie & Goldsborough

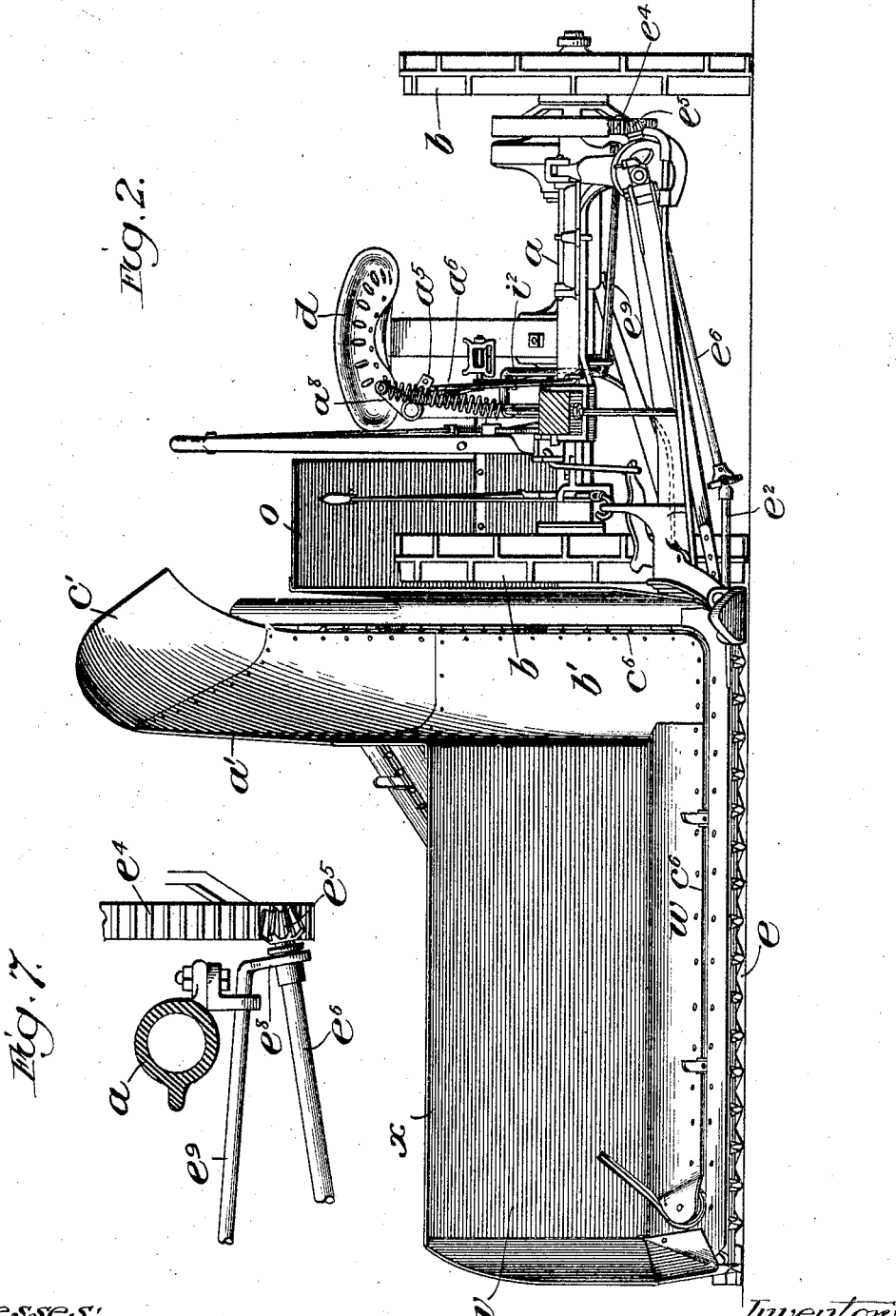

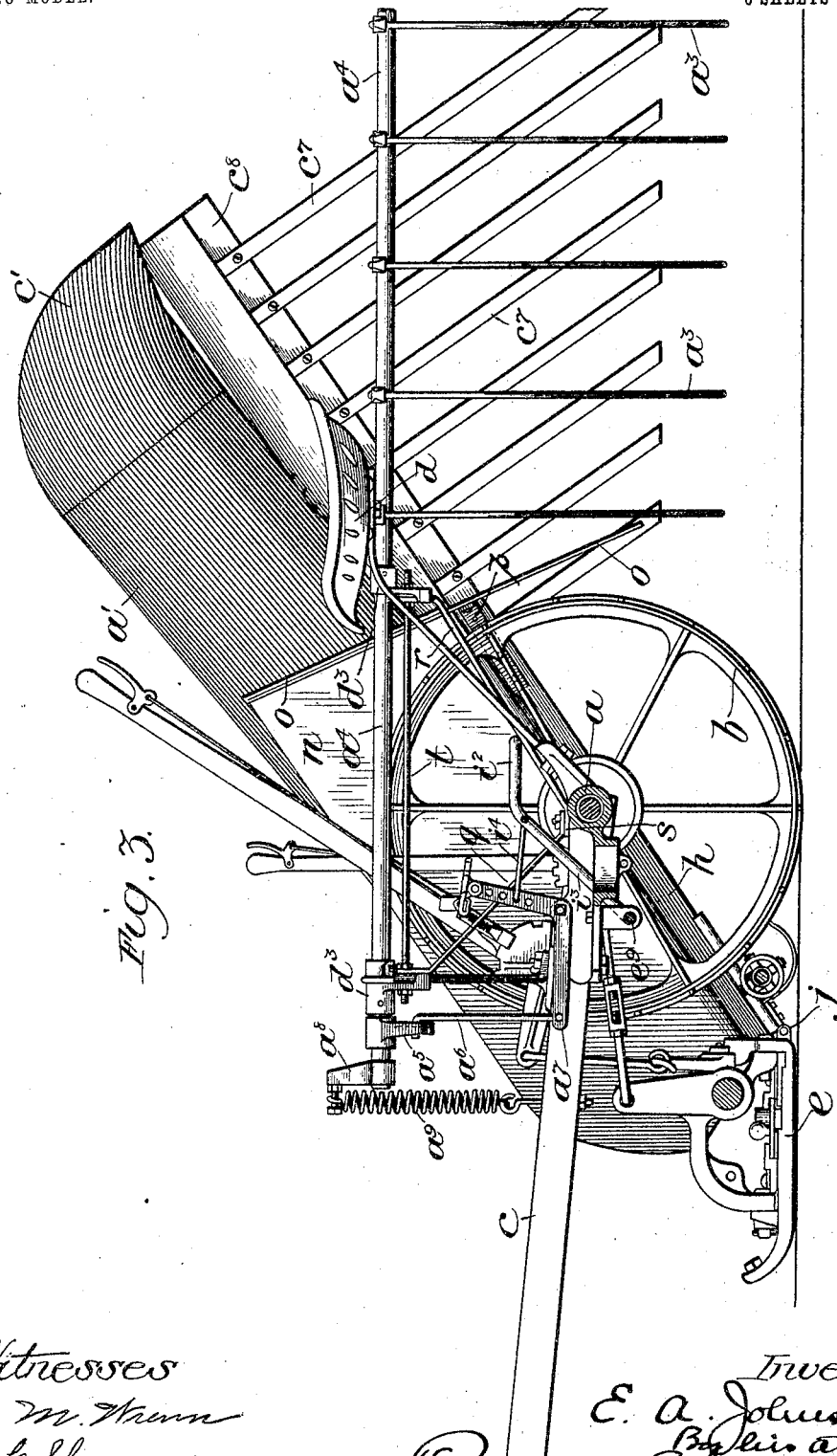

No. 770,860. PATENTED SEPT. 27, 1904.
E. A. JOHNSTON.
BUNCHING ATTACHMENT FOR MOWERS.
APPLICATION FILED DEC. 1, 1903.
NO MODEL. 6 SHEETS—SHEET 4.
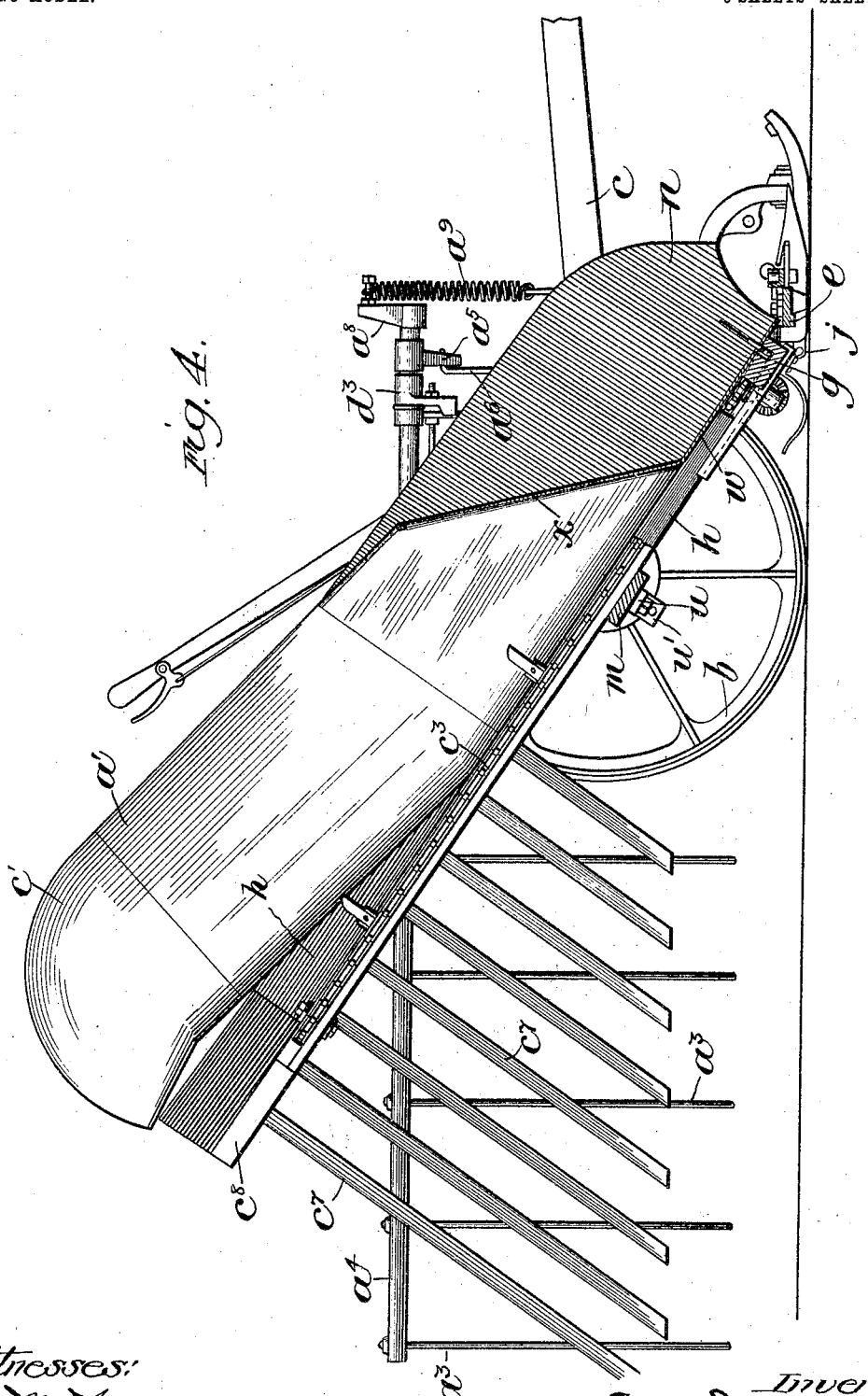

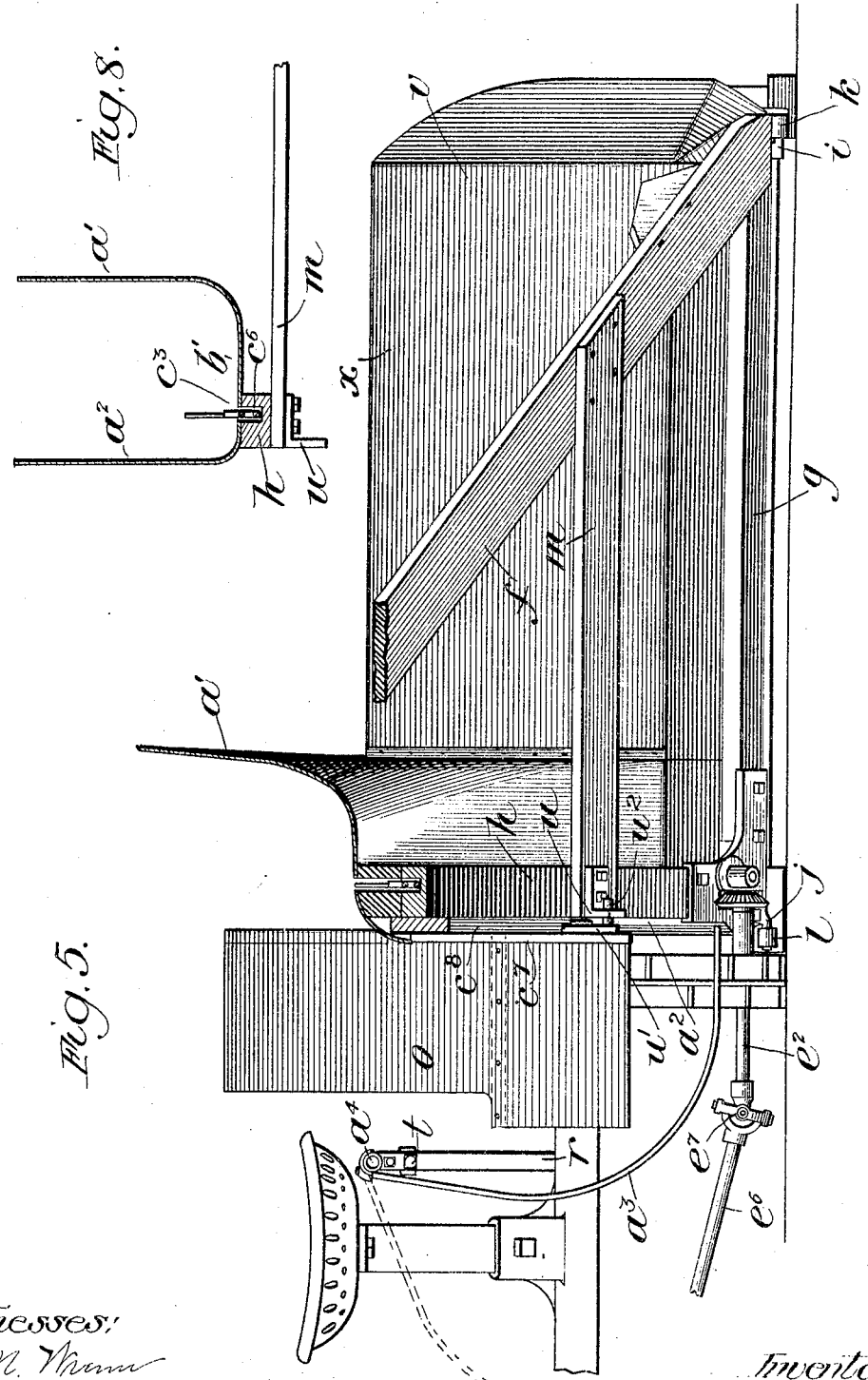

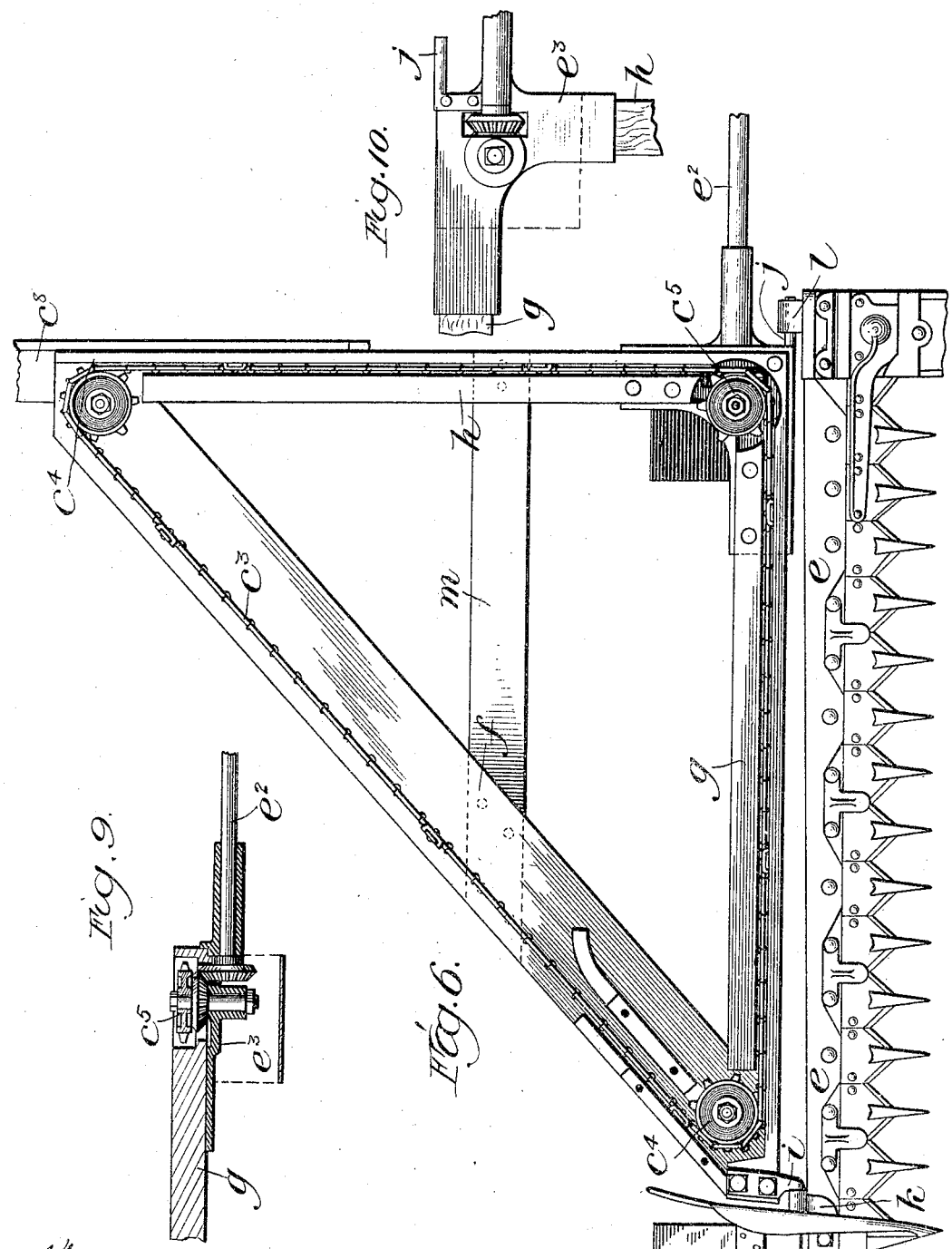

No. 770,860.                                               Patented September 27, 1904.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

BUNCHING ATTACHMENT FOR MOWERS.

SPECIFICATION forming part of Letters Patent No. 770,860, dated September 27, 1904.

Application filed December 1, 1903. Serial No. 183,315. (No model.)

*To all whom it may concern:*

Be it known that I, EDWARD A. JOHNSTON, a citizen of the United States, residing at Chicago, Cook county, State of Illinois, have invented certain new and useful Improvements in Bunching Attachments for Mowers; and I do hereby declare the following to be a full, clear, and exact description of the invention, such as will enable others skilled in the art to which it appertains to make and use the same.

The object in view is to adapt an ordinary mower to work as a buncher and dropper by carrying the grass or other crop sidewise from the cutting apparatus and collecting it in a receptacle located at the inner side and to the rear of the machine, the receptacle being under the driver's control, so that he may dump the same at will and drop the cut material in bunches on the ground.

To this end the invention consists generally in a frame that is attachable to and detachable from the finger-bar of the mower and is provided with suitable shields or aprons to catch and hold the grass and also has a conveyer to carry the grass sidewise and to the rear into a dumping-receptacle which also forms a part of the attachment and is controllable from the driver's seat.

Specifically the invention consists in the construction hereinafter described and claimed, and illustrated in the accompanying drawings, wherein—

Figure 1 is a plan view of the mower with the buncher attached. Fig. 2 is a front elevation of the same. Fig. 3 is an elevation of the same from the stubble side, one of the supporting-wheels being omitted. Fig. 4 is a section on the line 4 4 of Fig. 1. Fig. 5 is a section on the line 5 5 of Fig. 1. Fig. 6 is a detail showing in plan the framework of the attachment and the manner of connecting it to the finger-bar. Fig. 7 is a detail of the gearing for driving the conveyer. Fig. 8 is a cross-section of the rearwardly-extending trough of the attachment on line 8 8 of Fig. 1. Fig. 9 is a detail, partly in section, showing the manner of connecting the conveyer drive-shaft to the principal conveyer-sprocket; and Fig. 10 is an under side view of the same, showing the parts shown in top plan at the lower right-hand corner of Fig. 6.

Referring to the views, $a$ denotes the main frame, $b$ the supporting-wheels, $c$ the tongue, $d$ the driver's seat, and $e$ the finger-bar, of a mower of the usual or any preferred construction.

The attachment forming the subject of the present invention comprises a supporting-frame of substantially the width of the cutter-bar's length. This frame is composed of bars $f$, $g$, and $h$, that are preferably secured together in triangular form, as best shown in Fig. 6. At its front end this frame is provided with pintles $i\ j$, projecting in opposite directions and taking into loops or hinges $k\ l$, secured, respectively, to the outer and inner ends of the cutting apparatus, so that the attachment has a hinge-joint connection with the finger-bar and allows the latter to follow the inequalities of the ground without materially affecting the position of the attachment.

As best shown in Figs. 1, 3, and 5, the bar $f$ of the frame of the attachment extends diagonally upward and rearward from the outer corner of the frame and is supported about midway of its length by a bar $m$, which is secured at its inner end to the inner bar $h$, and the entire attachment is supported from the machine-axle by a link $u'$, which is pivotally hung on the projecting end of the axle and has a pin $u^2$ at its lower end taking into an eye in a bracket $u$, that is secured to the under side of the cross-bar $m$, where it unites with the bar $h$.

The framework of the attachment is held in the upwardly-inclined position shown in the drawings. Its entire weight is borne by the mower, and the hinged or pivoted connection between the front bar $g$ and the finger-bar and the similar connection of the attachment with the machine-axle provides a certain flexibility of action to allow for the rising and falling and rocking movements of the cutting apparatus.

The bar $g$ of the attachment has a metal shield or apron $v$ secured to it that extends transversely of the machine parallel with and behind the finger-bar. This apron is bent, as best shown in Fig. 4, so as to have a floor portion $w$ and an inclined backboard $x$, forming a receptacle for the grass or other cut material immediately in rear of the finger-bar. The receptacle extends to near the inner shoe of the cutting apparatus, where it abruptly turns rearward, as best shown in Fig. 1, in the form of a trough having a vertical side board $a'$ on the side of the standing crop and a similar side board $a^2$ on the side toward the stubble. The board $a'$ extends rearward the full length of the attachment and is bent stubbleward at its rear end, as shown at $c'$. The side $a^2$ is secured to the bar $h$ of the attachment and extends rearward only to a vertical transverse apron $o$, to which it is secured along its rear edge, as shown at $c^2$ in Fig. 1. The apron $o$ is secured to the bar $h$ of the attachment by a strap-iron $p$. (Best shown in Fig. 3.) The above-described difference in the length of the side boards gives the rearwardly-extending trough a delivery-opening toward the stubble side of the machine, as clearly indicated in Figs. 1, 2, and 3 of the drawings.

In connection with the side delivery-receptacle above described the attachment has also a conveyer for carrying the cut material sidewise along the floor $w$ and rearward through the trough to the point of discharge at its upper end. Preferably this conveyer consists of an endless chain $c^3$ of any suitable construction, having teeth at intervals along its length and arranged to travel around sprockets $c^4$ $c^4$ and $c^5$, journaled at the angles of the triangular supporting-frame, so that the chain travels along the floor of the receptacle parallel with and just behind the cutter-bar of the mower and turns rearward at the inner shoe and travels lengthwise the trough to the point of discharge, the teeth on the chain moving in slots $c^6$, cut in the floor of the receptacle and the bottom of the trough, the latter being preferably raised slightly, so that the teeth disappear beneath it, thus disengaging the material.

As the material is delivered from the upper end of the trough it is deflected stubbleward by the curved board $c'$ and received by a dropper, including a series of slats $c^7$, secured to an extension $c^8$ of the bar $h$ of the framework of the attachment. These slats extend diagonally downward from the bar and are preferably graduated in length, so that their lower ends will all be about the same distance from the ground. The slats form one side of the dropper and the apron $o$ forms the forward end thereof. The other side of the dropper is formed by a series of curved fingers $a^3$, that are secured at their upper ends to a rock-shaft $a^4$ and have their lower ends extending normally toward the slats $c^7$, as best shown in Figs. 1 and 5. The rock-shaft is journaled in bearings $d^3$, secured to the upper ends of diverging bars $q$ $r$, that are fastened at their lower ends to the frame of the mower at $s$ and are connected together at their upper ends by an adjustable tie-rod $t$. The shaft is rocked by the driver, so as to dump the dropper and deposit the cut material in bunches on the ground at the rear and to one side of the machine. Near its front end the rock-shaft has a crank-arm $a^5$ projecting from it, and a rod $a^6$ connects the arm with one end of a bell-crank lever $a^7$, pivoted on the main frame. The other end of the bell-crank lever is provided with a treadle, so that the driver sitting in the seat $d$ may rock the shaft $a^4$ so as to raise or lower the fingers $a^3$. At its extreme front end the rock-shaft has another arm, $a^8$, projecting upward therefrom, and a spring $a^9$, having its lower end secured to the tongue, exerts a constant downward pull on the arm, tending to raise or lower the fingers $a^3$ as the arm $a^8$ is on one side or the other of the vertical plane of the shaft.

The conveyer is driven by a short shaft $e^2$, journaled in a casting $e^3$, in which is also formed the bearing for the shaft of the sprocket $c^5$. The shaft $e^2$ is driven from the main gear $e^4$ of the machine by means of a diagonally-arranged shaft $e^6$, having a pinion $e^5$ at its stubble end which meshes with the wheel $e^4$. The shaft $e^6$ is connected to the short shaft $e^2$ by a universal joint $e^7$, and the bearing for the outer end of the shaft is carried in the bent end $e^8$ of a rock-shaft $e^9$, extending transversely of the machine, as shown in Fig. 1, and having at its outer end an arm $i^3$ extending upward and rearward and provided with a treadle $i^2$ in convenient reach for the driver's foot. This arrangement, as will be understood from the drawings, enables the driver to disconnect the pinion $e^5$ from the wheel $e^4$ and stop the movement of the conveyer, and in order that the action of the conveyer may be discontinued when the dropper is being dumped the treadle $i^2$ is connected to the treadle of the dropper-operating mechanism by a link $i^4$, so that whenever the driver actuates the arm $a^8$ to raise the dropper-fingers $a^3$ the rock-shaft $e^9$ will be actuated so as to throw the pinion of the shaft $e^6$ out of mesh with the gear $e^4$. The conveyer $c^3$ thereupon stops, and the grass or other crop that is being cut collects on the floor $w$ while the accumulation in the dropper is being deposited. When the driver reverses the treadle to return the dropper-fingers to receiving position, the treadle $i^2$ is also actuated and the shaft $e^9$ rocks in the reverse direction, so as to reëngage the pinion $e^5$ with its drive-gear $e^4$, thereby restoring the conveyer. The connection between the arm $i^3$ and the treadle-arm of the bell-crank $a^7$ is preferably made adjustable, as shown in Fig. 3, so as to accurately time the stopping and starting of the conveyer with respect to the movement of the dropper-fingers.

The construction and arrangements of parts being as thus described, the operation of the device will be readily understood. The dropper-fingers return naturally to receiving position and are held there mainly by the tension of the spring $a^9$, the arm $a^5$ being at this time slightly stubbleward of the dead-center— i. e., the vertical plane of the shaft $a^4$. Only a slight pressure of the driver's foot on the treadle is necessary to supplement the action of the spring in holding the dropper-fingers closed. When the driver removes his foot from the lever, the spring tension not being sufficient to keep the dropper entirely closed, the weight of the fingers and the load they carry cause the bar $a^4$ to rock sufficiently to throw the arm $a^8$ on the other side of the dead-center, and the spring at this time assists the driver in raising the fingers into the position shown in dotted lines in Fig. 5. The conveyer travels, as will be understood from the drawings, from the outer end of the finger-bar toward the inner shoe, at which point it turns abruptly to the rear and carries the material through the trough to the discharge-opening. At this point the side board $a'$ is slightly curved transversely, as best shown in Figs. 1 and 2, so as to deflect the material sidewise into the dropper, the discharge of any material that does not naturally fall out being insured by the curved end board $c'$.

It is to be noted that the dropper being entirely under the control of the driver, the material may be dumped in large or small bunches, as desired, and the side delivery of the trough, together with the location of the attachment, insures the dropping of the bunches out of the way of the cutting apparatus on the succeeding round of the machine.

Having thus described my invention, what I claim is—

1. A bunching attachment for mowers, comprising an endless conveyer to carry the cut material stubbleward in a right line lengthwise the finger-bar and thence rearward, a dropper into which the material is received from the conveyer, and means whereby the driver may dump the dropper at will.

2. A bunching attachment for mowers, comprising a floor or platform extending stubbleward lengthwise the finger-bar, a trough leading from the inner end of the floor rearward, a dropper at the rear and to one side of the discharge end of the trough, a conveyer traveling along the floor and trough, and means whereby the driver may dump the dropper at will.

3. A bunching attachment for mowers, comprising a frame having a floor or platform extending stubbleward lengthwise the finger-bar and having a backboard in rear thereof, a trough leading from the inner end of the floor rearward and having a side delivery-opening, a dropper at the side of the rear end of the trough in position to receive the cut material from the lateral opening thereof, a conveyer traveling along the floor and trough, and means whereby the driver may dump the dropper at will.

4. A bunching attachment for mowers, comprising a triangular frame having a floor or platform extending stubbleward lengthwise the finger-bar to the inner end thereof, a trough leading rearward from the inner end thereof, sprocket-wheels at the corners of the frame carrying an endless chain having teeth projecting up through slots in the floor and trough, a side delivery-opening at the rear end of the trough, a dropper in position to receive the material from said opening, and means whereby the driver may dump the dropper at will.

5. The combination of a mower, and a bunching attachment detachably connected thereto in rear of the finger-bar, and comprising a conveyer to carry the cut material stubbleward to the inner end of the finger-bar and thence rearward to a dropper, and means whereby the driver may dump the dropper and simultaneously stop the conveyer.

6. The combination of a mower, a bunching attachment connected to and in rear of the finger-bar, a supporting connection between the mower-frame and the frame of the bunching attachment for supporting the latter in an upwardly-inclined position, said attachment comprising a floor or platform extending stubbleward near the level of the finger-bar with a trough extending rearward from the inner end of the platform, and a dropper located below and to one side of the rear end of the trough.

7. The combination of a mower, a bunching attachment connected to and in rear of the finger-bar, a conveyer to carry the cut material lengthwise the finger-bar to the inner end thereof and thence rearward to the point of discharge, a fore-and-aft rock-shaft journaled on the machine-frame and having carrying-fingers extending toward and under the discharge-opening of the attachment, and a treadle having connections to the rock-shaft whereby the driver may dump the dropper at will.

8. The combination of a mower, a bunching attachment connected thereto in rear of the finger-bar and supported in an upwardly and rearwardly inclined position, a series of slats $c^7$ extending downward from the stubble side of the attachment below its discharge-opening, and a fore-and-aft rock-shaft journaled on the machine-frame and having a series of carrying-fingers projecting downward and toward the slats to form a dropper.

9. The combination of a mower, a bunching attachment connected thereto in rear of the finger-bar and supported in an upwardly and rearwardly inclined position, a series of slats $c^7$ extending downward from the stubble side of the attachment below its discharge-opening, a fore-and-aft rock-shaft journaled on the machine-frame and having a series of carrying-fingers projecting downward and toward the slats to form a dropper, a treadle and connections to the rock-shaft whereby the driver may dump the dropper, and a spring-actuated arm $a^8$ that is positioned on the shaft so that the spring assists to rock the shaft both in dumping and restoring the fingers.

10. The combination of a mower, a bunching attachment connected thereto and comprising a conveyer to carry the cut material to the place of discharge, a shaft $e^2$, a gear-wheel $e^4$, a shaft $e^6$ to drive the conveyer, having a pinion $e^5$ meshing with the gear-wheel, a universal joint $e^7$ connecting the shafts $e^2$ and $e^6$ and a rock-shaft $e^9$ having a cranked end $e^8$ in which the pinion end of the shaft $e^6$ is journaled, said rock-shaft having a treadle whereby the driver may rock it to connect and disconnect the pinion and gear.

11. The combination of a mower, a bunching attachment connected thereto and comprising a conveyer to carry the cut material to the place of discharge and a dropper to receive said material from the conveyer, said dropper comprising carrying-fingers and a rock-shaft journaled on the mower-frame, a gear-wheel $e^4$, a conveyer drive-shaft $e^6$ having a pinion $e^5$ meshing with the gear-wheel, a rock-shaft $e^9$ having a cranked end $e^8$ carrying the pinion end of the shaft $e^6$, a treadle connected to the dropper rock-shaft to dump the carrying-fingers, and connections from the treadle to the rock-shaft $e^9$, whereby when the carrying-fingers of the dropper are dumped the pinion $e^5$ is disconnected from the gear $e^4$ and the conveyer is stopped.

In testimony whereof I affix my signature in presence of two witnesses.

EDWARD A. JOHNSTON.

Witnesses:
  WILLIAM WEBBER,
  CHAS. N. CHAMBERS.